United States Patent
Chung (10) Patent No.: US 12,229,332 B1
(45) Date of Patent: Feb. 18, 2025

(54) TRACKING SYSTEM AND METHOD

(71) Applicant: HTC Corporation, Taoyuan (TW)

(72) Inventor: Wei-Jen Chung, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/493,792

(22) Filed: Oct. 24, 2023

(51) Int. Cl.
*G06F 3/01* (2006.01)
*G06F 3/0346* (2013.01)
*G06T 7/246* (2017.01)

(52) U.S. Cl.
CPC ............ *G06F 3/011* (2013.01); *G06F 3/0346* (2013.01); *G06T 7/246* (2017.01); *G06T 2207/30196* (2013.01)

(58) Field of Classification Search
None
See application file for complete search history.

(56) References Cited

U.S. PATENT DOCUMENTS

| | | | | |
|---|---|---|---|---|
| 2020/0327860 A1* | 10/2020 | Chen | ............... | G06F 3/012 |
| 2020/0327867 A1* | 10/2020 | Wang | ............... | G09G 3/001 |
| 2020/0329229 A1* | 10/2020 | Chen | ............... | G06T 7/74 |
| 2023/0282031 A1* | 9/2023 | Ali Akbarian | ....... | G06V 10/774 |
| | | | | 382/103 |
| 2023/0326135 A1* | 10/2023 | Cashman | ............... | G06F 3/017 |
| | | | | 345/419 |

FOREIGN PATENT DOCUMENTS

| | | |
|---|---|---|
| CN | 110456905 | 11/2019 |
| CN | 116661586 | 8/2023 |

OTHER PUBLICATIONS

"Office Action of Taiwan Counterpart Application", issued on Nov. 12, 2024, p. 1-p. 8.

* cited by examiner

*Primary Examiner* — Christopher J Kohlman
(74) *Attorney, Agent, or Firm* — JCIPRNET (57) ABSTRACT

A tracking system is provided. A head-mounted display device is adapted to be mounted on a head of a user and comprises a camera and a processor. The camera obtains a body image includes a body portion of the user. The processor is configured to: determine a relative position between a body motion sensor of a body tracker and the body portion of the user based on the body image; and perform a target tracking of the body portion based on the relative position and sensor data of the body motion sensor of the body tracker. A body tracker is adapted to be mounted on the body portion of the user and comprises a body motion sensor. The body motion sensor obtains the sensor data. The sensor data indicates a movement and/or a rotation of the body portion.

20 Claims, 10 Drawing Sheets

TRACKING SYSTEM AND METHOD

BACKGROUND

Technical Field

The disclosure relates to a tracking system; particularly, the disclosure relates to a tracking system and a tracking method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

SUMMARY

The disclosure is direct to a tracking system and a tracking method, so as to track a body portion of the user more accurately In this disclosure, a tracking system is provided. The tracking system includes a head-mounted device and a body tracker. The head-mounted display device is adapted to be mounted on a head of a user and comprises a camera and a processor. The camera is configured to obtain a body image including a body portion of the user. The processor, configured to: determine a relative position between a body motion sensor of a body tracker and the body portion of the user based on the body image; and perform a target tracking of the body portion based on the relative position and sensor data of the body motion sensor of the body tracker. The body tracker is adapted to be mounted on the body portion of the user and comprises a body motion sensor. The body motion sensor is configured to obtain the sensor data. The sensor data is configured to indicate a movement and/or a rotation of the body portion.

In this disclosure, a tracking method is provided. The tracking method includes: obtaining a body image including a body portion of a user; determining a relative position between a body motion sensor of a body tracker and the body portion of the user based on the body image, wherein the body tracker is adapted to be mounted on the body portion of the user; obtaining sensor data of the body motion sensor of the body tracker, wherein the sensor data is configured to indicate a movement and/or a rotation of the body portion; and performing a target tracking of the body portion based on the relative position and the sensor data.

Based on the above, according to the tracking system and the tracking method, even if the body tracker is not worn properly on the body portion of the user, the processor is still able to track the body portion accurately based on the relative position between the body motion sensor and the body portion. Therefore, the user experience is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms "first", "second", and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided through one or more devices.

A body tracking device may be used to track a body portion of a user. For example, the body tracking device may include an accelerometer and/or a gyroscope. A user may wear the body tracking device on the body portion, so that the body tracking device is able to track the body portion based on a detecting result of the accelerometer and/or the gyroscope. However, while the user wears the body tracking device, the body tracking device may not be worn properly. For example, the body tracking device may be worn incorrectly or may be falling during activities. Further, personal factors (such as thickness of wrists, ankles, or clothing) or difference in wearing (due to the diverse designs of the wristbands and bracelets) may also cause inappropriate wear of the body tracking device. As a result, the detecting result may be not accurate, thereby decreasing the user experience. For instance, an avatar representing the user may twist and turn unnaturally. Therefore, it is the pursuit of people skilled in the art to provide a tracking method to track the body portion of the user accurately.

Figure 1A:
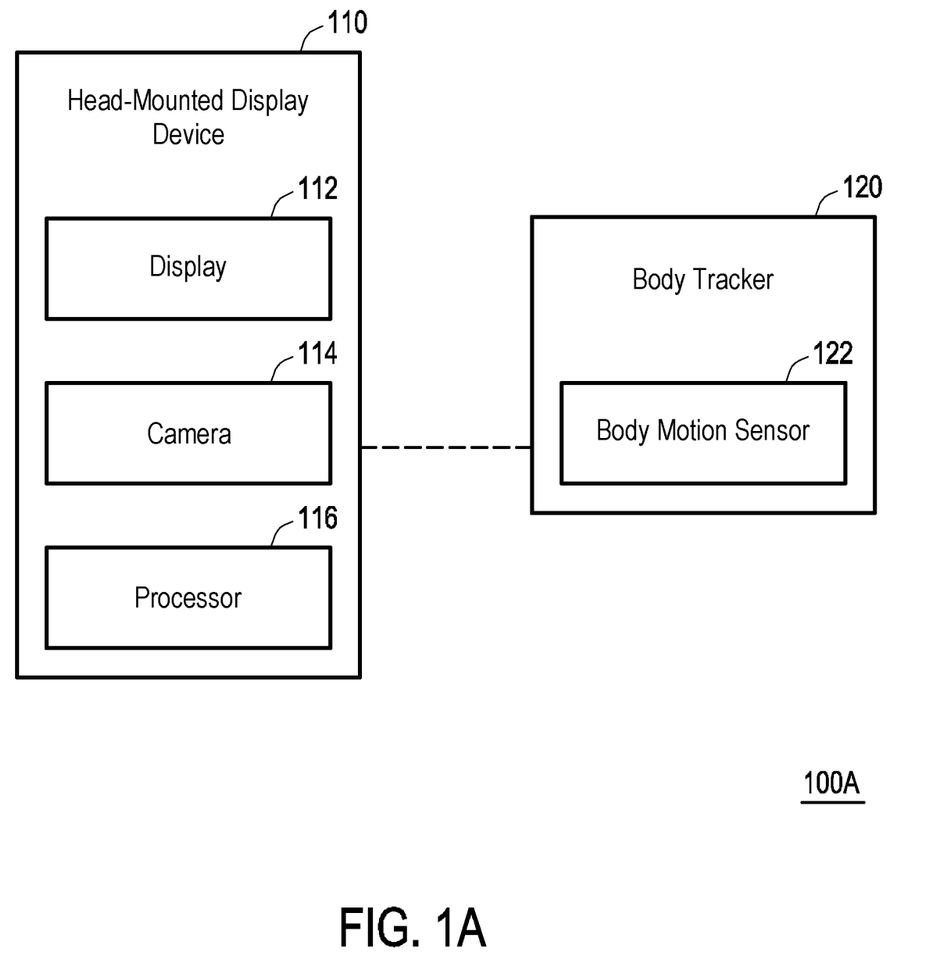
FIG. 1A is a schematic diagram of a tracking system according to an embodiment of the disclosure.

FIG. 1A is a schematic diagram of a tracking system according to an embodiment of the disclosure. With reference to FIG. 1A, a tracking system 100A may include a head-mounted display (HMD) device 110 and a body tracker 120. The HMD device 110 may include a display 112, a camera 114, and a processor 116. The body tracker 120 may include a body motion sensor 122.

The HMD device 110 may be adapted to be mounted on a head of a user. The body tracker 120 may be adapted to be mounted on the body portion of the user. The body motion sensor 122 may be configured to obtain sensor data. The sensor data may be configured to indicate a movement and/or a rotation of the body portion of the user. The display 112 may be configured to display a virtual world. The camera 114 may be configured to obtain a body image including a body portion of the user. The processor 116 may be configured to determine a relative position between the body motion sensor 122 of the body tracker 120 and the body portion of the user based on the body image. Further, the processor 116 may be configured to perform a target tracking of the body portion based on the relative position and sensor data of the body motion sensor 122 of the body tracker 120.

In one embodiment, the processor 116 may be configured to perform an object detection to recognize the body portion and the body motion sensor 122 in the body image utilizing an object detection algorithm. That is, a pre-stored image including the shape of the body portion and/or the body motion sensor 122 may be pre-stored in a memory of the HMD device 110. Based on the body image and the pre-stored image, the processor 116 may be configured to determine the relative position between the body motion sensor 122 of the body tracker 120 and the body portion of the user.

In one embodiment, since the relative position is determined, the processor 116 may be configured to perform the target tracking without the body image. That is, the processor 116 may be configured to determine a movement of the body portion based on the sensor data of the body motion sensor 122. Therefore, while the body portion is not the in field of view (FOV) of the camera 114, the processor 116 is still able to perform the target tracking without the body image based on the relative position and sensor data.

Figure 1B:
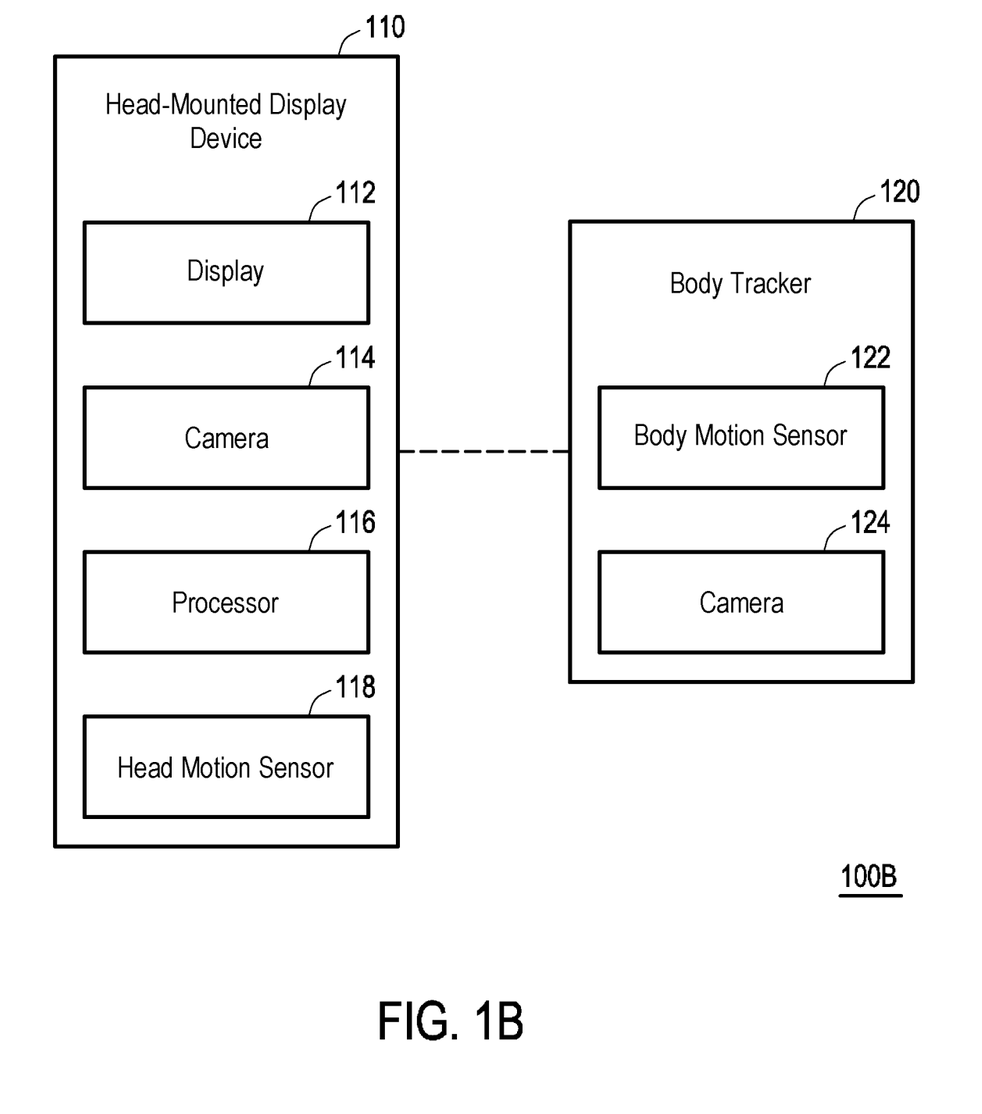
FIG. 1B is a schematic diagram of a tracking system according to an embodiment of the disclosure.

FIG. 1B is a schematic diagram of a tracking system according to an embodiment of the disclosure. With reference to FIG. 1B, a tracking system 100B may include an HMD device 110 and a body tracker 120. The HMD device 110 may include a display 112, a camera 114, a processor 116, and a head motion sensor 118. The body tracker 120 may include a body motion sensor 122 and a camera 124. The camera 114 of the HMD device 110 may be also known as a device camera and the camera 124 of the body tracker 120 may be also known as a tracker camera.

In one embodiment, the processor 116 may be configured to obtain a simultaneous localization and mapping (SLAM) map of an environment around the user. The SLAM map may be generated by the processor 116 based on images obtained by the camera 114 utilizing a SLAM algorithm. On the other hand, the SLAM map may be obtained from other devices or pre-stored in a memory of the HMD device 110. That is, this is disclosure does not limit how the processor 116 obtains the SLAM map. Further, the processer 116 may be configured to determine a device coordinate of the HMD device 110 in the SLAM map.

In addition, the camera 124 of the body tracker 120 may be configured to obtain a feature image including an environment around the body portion. Based on the feature image, the processor 116 may be configured to determine a tracker coordinate of the body tracker 120 and a sensor coordinate of the body motion sensor 122 of the body tracker 120 in the SLAM map. That is, the HMD device 110 and the body tracker 120 may be configured to share the SLAM map, so that the tracker 120 is able to know a position of itself in the SLAM map. Moreover, based on the device coordinate and the sensor coordinate, the processor 116 may be configured to determine the relative position between the body motion sensor 122 of the body tracker 120 and the body portion of the user.

In one embodiment, since the relative position is determined, the processor 116 may be configured to perform the target tracking without the body image. That is, the processor 116 may be configured to determine a movement of the body portion based on the sensor data (also known as tracker sensor data) of the body motion sensor 122 or the feature image of the camera 124. Therefore, while the body portion is not the in field of view (FOV) of the camera 114, the processor 116 is still able to perform the target tracking without the body image based on the relative position and sensor data. Similarly, the processor 116 may be configured to determine a movement of the head of the user based on sensor data (also known as device sensor data) of the head motion sensor 118.

In one embodiment, the HMD device 110 may be configured to display content of AR, VR, MR, or XR. The HMD device 110 may include, for example, a headset, wearable glasses (e.g., AR/VR goggles), other similar devices adapted for AR, VR, MR, XR or other reality related technologies, or a combination of these devices. However, this disclosure is not limited thereto.

In one embodiment, the display 112 may include, for example, an organic light-emitting diode (OLED) display device, a mini LED display device, a micro LED display device, a quantum dot (QD) LED display device, a liquid-crystal display (LCD) display device, a tiled display device, a foldable display device, or an electronic paper display (EPD). However, this disclosure is not limited thereto.

In one embodiment, the camera 114 and/or the camera 124, may include, for example, a complementary metal oxide semiconductor (CMOS) camera, a charge coupled device (CCD) camera, a light detection and ranging (LiDAR) device, a radar, an infrared sensor, an ultrasonic sensor, other similar devices, or a combination of these devices. However, this disclosure is not limited thereto.

In one embodiment, the body tracker 120 may include a tracker processor (not shown). The tracker processor and/or the processor 116 may include, for example, a microcontroller unit (MCU), a central processing unit (CPU), a microprocessor, a digital signal processor (DSP), a programmable controller, a programmable logic device (PLD), other similar devices, or a combination of these devices. The disclosure is not limited thereto. In addition, in an embodiment, each of functions of the processor 116 may be achieved as multiple program codes. The program codes are stored in a memory, and executed by the processor 116. Alternatively, in an embodiment, each of the functions of the processor 116 may be achieved as one or more circuits. The disclosure does not limit the use of software or hardware to achieve the functions of the processor 116.

In one embodiment, the head motion sensor 118 and/or the body motion sensor 122 may include, for example, a gyroscope, an accelerometer, other similar devices, or a combination of these devices. However, this disclosure is not limited thereto. In one embodiment, the head motion sensor 118 and/or the body motion sensor 122 may be a gyroscope and the sensor data may include three angular velocities in three degrees of freedom (DOF). The three angular velocities may include a roll angular velocity about an X axis, a pitch angular velocity about a Y axis, and a yaw angular velocity about a Z axis. In one embodiment, the head motion sensor 118 and/or the body motion sensor 122 may be an accelerometer and the sensor data may include three linear acceleration values in three degrees of freedom. The three linear acceleration values may include a first acceleration value along the X axis, a second acceleration value along the Y axis, and a third acceleration value along the Z axis. In one embodiment, the head motion sensor 118 and/or the body motion sensor 122 may include a gyroscope and an accelerometer and the sensor data may include changes in six degrees of freedom and the changes in the six degrees of freedom includes the three angular velocities corresponding to three perpendicular axes (e.g., X,Y,Z axes) and the three linear acceleration values corresponding to the three perpendicular axes.

In one embodiment, each of the HMD device 110 and the body tracker 120 may include a network module and the network module may include, for example, a wired network module, a wireless network module, a Bluetooth module, an infrared module, a radio frequency identification (RFID) module, a Zigbee network module, or a near field communication (NFC) network module, but the disclosure is not limited thereto. That is, the HMD device 110 may be configured to communicate with the body tracker 120 through either wired communication or wireless communication.

In some embodiments, the HMD device 110 and/or the body tracker 120 may further include a memory. In one embodiment, the memory may include, for example, NAND flash memory cores, NOR flash memory cores, static random access memory (SRAM) cores, dynamic random access memory (DRAM) cores, magnetoresistive random access memory (MRAM) cores, Phase change memory (PCM) cores, resistive random access memory (ReRAM) cores, 3D XPoint memory cores, ferroelectric random-access memory (FeRAM) cores, and other types of memory cores that are suitable for storing data. However, this disclosure is not limited thereto.

Figure 2:
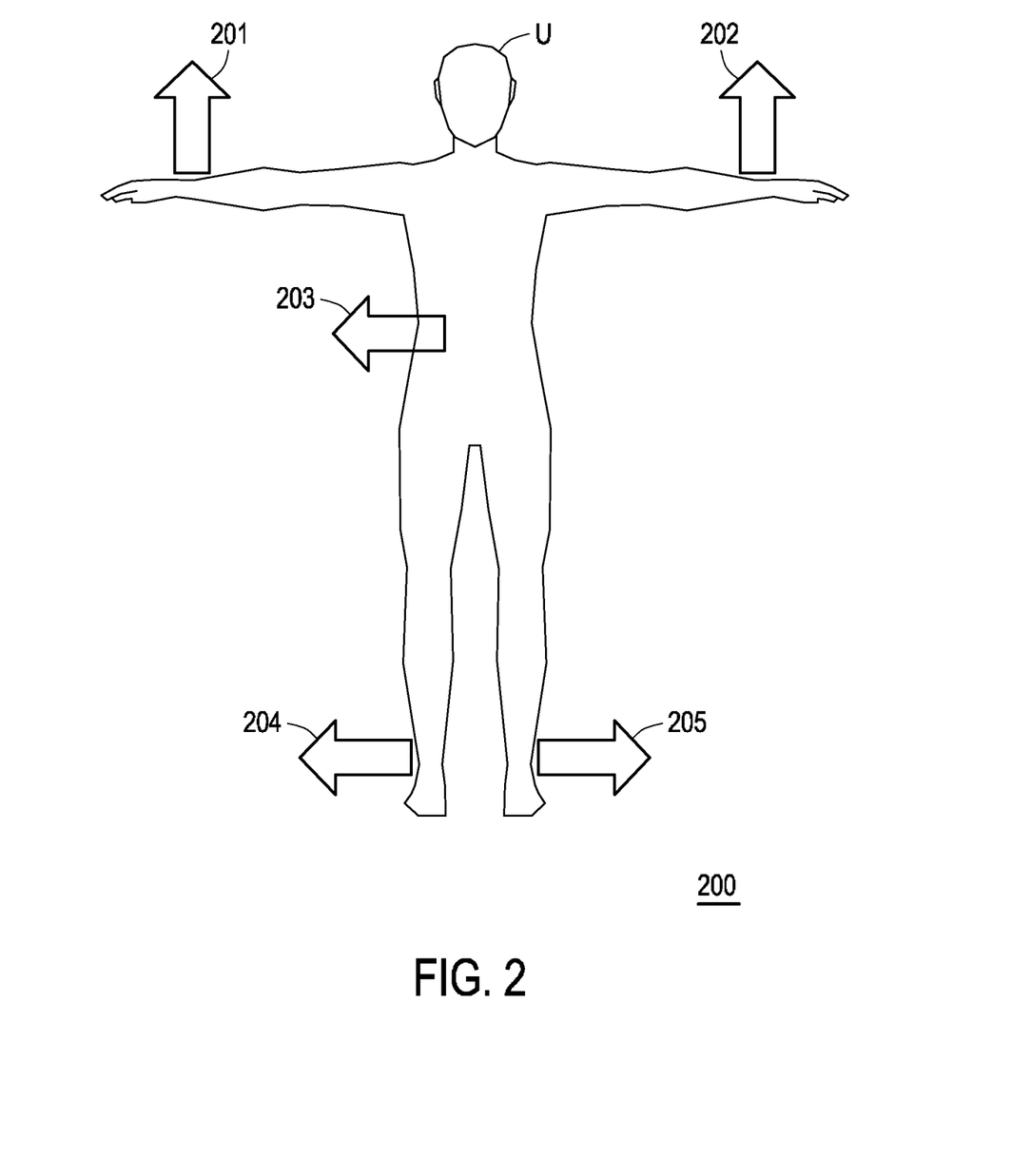
FIG. 2 is a schematic diagram of a tracking scenario according to an embodiment of the disclosure.

FIG. 2 is a schematic diagram of a tracking scenario according to an embodiment of the disclosure. With reference to FIG. 1A to FIG. 2, a tracking scenario 200 depicts some key nodes of the body of the user U. The key nodes may be the right wrist, the left wrist, the waist, the right ankle, and the left ankle. However, this disclosure is not limited thereto. By detection the movements 201-205 of the key nodes, a movement of the user U may be determined.

In one embodiment, the body tracker 120 may be adapted to be worn on or near one of the key nodes. That is, the body portion may be one of the key nodes. In other words, the body tracker 120 may include, for example, a wristband, a glove, a gauntlet, a ring, a palmband, a waistband, an ankle brace, a sock, other similar devices, or a combination of these devices. Based on the sensor data of the body tracker 120, the processor 116 may be able to collect information of the key nodes of the body of the user U.

In this manner, while the user U is moving in the real world, an avatar in the virtual world displayed by the HMD device 110 may move based on the sensor data of the body tracker 120. That is, the display 112 of the HMD device 110 may be configured to display a virtual body portion of the avatar of the user U based on the target tracking. Therefore, the avatar may reflect the movement of the user U in the real world.

Figure 3A:
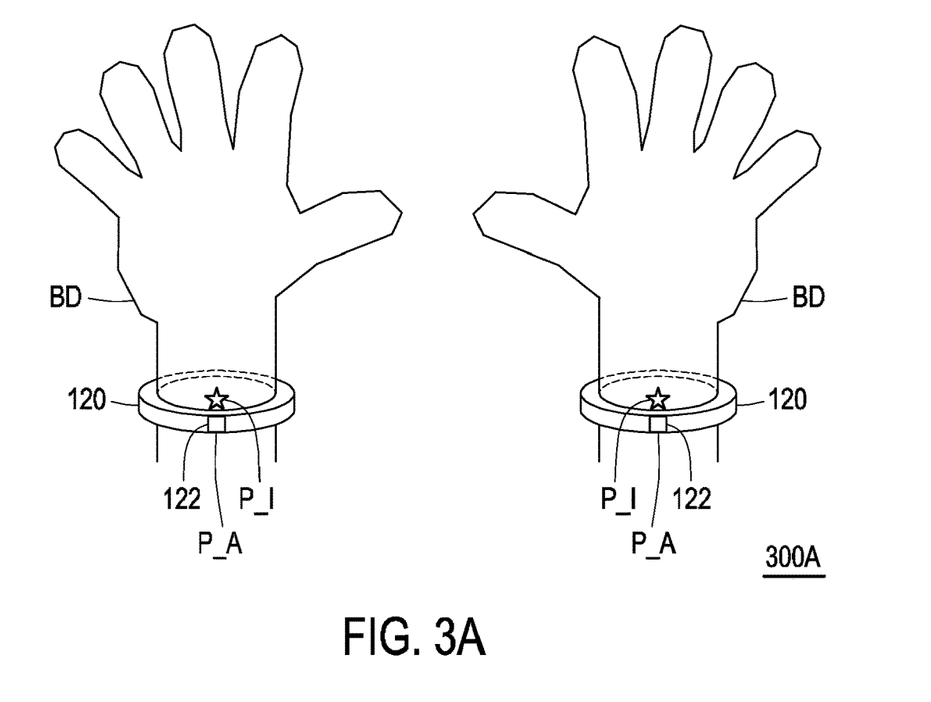
FIG. 3A is a schematic diagram of a tracking scenario according to an embodiment of the disclosure.
Figure 3B:
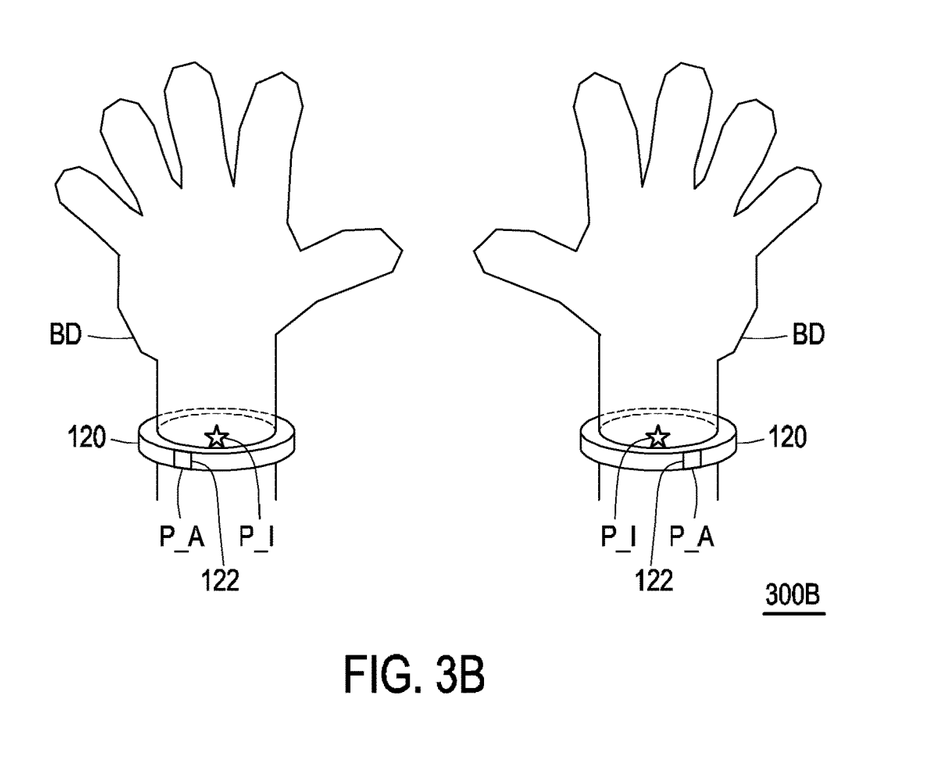
FIG. 3B is a schematic diagram of a tracking scenario according to an embodiment of the disclosure.

FIG. 3A is a schematic diagram of a tracking scenario according to an embodiment of the disclosure. FIG. 3B is a schematic diagram of a tracking scenario according to an embodiment of the disclosure. With reference to FIG. 1A to FIG. 3B, a tracking scenario 300A and a tracking scenario depict how the body tracker 120 may be worn on the body portion BD of the user U.

In one embodiment, the body tracker 120 may be adapted to be worn on the body portion BD of the user U. Ideally, while the body tracker 120 is worn on the body portion BD, an actual wearing position P_A of the body motion sensor 122 should be aligned with an ideal wearing position P_I on the body portion BD. For example, the body portion BD may be a wrist of the user U and the body tracker 120 may be a wristband. The ideal wearing position P_I may be a central point of the wrist (e.g., an intersection point of the wrist and an extension line of the middle finger) or a surface of the wrist joint. However, this disclosure is not limited thereto. The ideal wearing position P_I on the body portion BD may be pre-stored in a memory of the body tracker 120 or determined by the user U. That is, the processor 116 may be configured to obtain the ideal wearing position P_I on the body portion BD from the memory.

As shown in FIG. 3A, the actual wearing position P_A of the body motion sensor 122 is aligned with the ideal wearing position P_I on the body portion BD. In one embodiment, the processor 116 may be configured to determine the actual wearing position P_A based on the body image. Therefore, the sensor data of the body motion sensor 122 may reflect a movement of the body portion BD accurately. On the other hand, as shown in FIG. 3B, the actual wearing position P_A of the body motion sensor 122 is not aligned with the ideal wearing position P_I on the body portion BD. Therefore, the sensor data of the body motion sensor 122 may not reflect a movement of the body portion BD accurately. That is, since a relative position between the actual wearing position P_A and ideal wearing position P_I exists, the processor 116 may not be able to perform the target tracking of the body portion BD accurately.

To perform the target tracking of the body portion BD accurately, the processor 116 may be configured to determine the relative position between the actual wearing position P_A and ideal wearing position P_I based on the body image captured by the camera 114. In this manner, even if the body tracker 120 is not worn properly on the body portion BD of the user U, the processor 116 is still able to track the body portion BD accurately based on the relative position between the body motion sensor 122 and the body portion BD. Therefore, the user experience is improved.

Figure 4A:
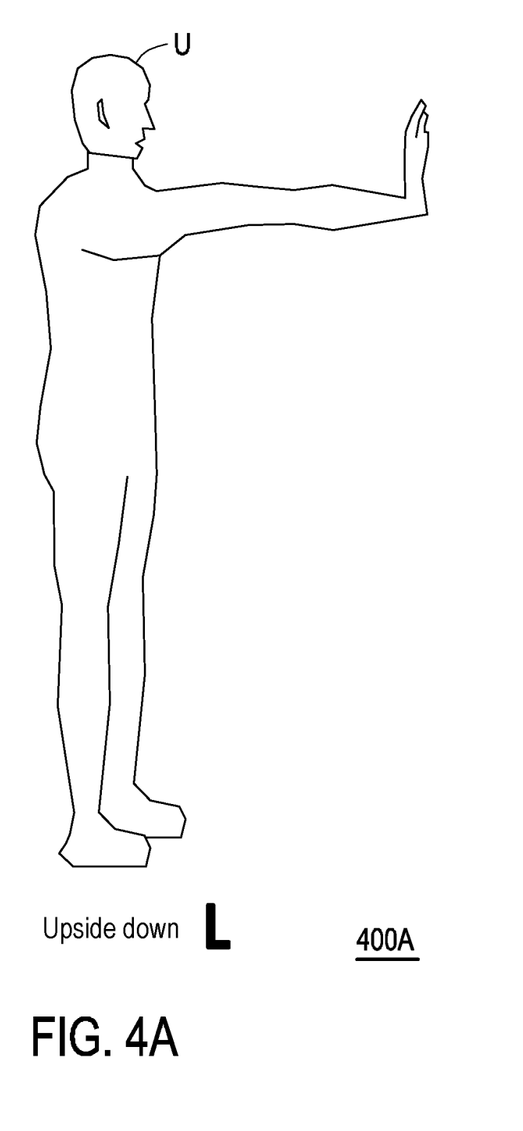
FIG. 4A is a schematic diagram of a tracking scenario according to an embodiment of the disclosure.

FIG. 4A is a schematic diagram of a tracking scenario according to an embodiment of the disclosure. With reference to FIG. 1A to FIG. 4A, a tracking scenario 400A depicts a L-shaped pose as a calibration pose for determination of the relative position between the body motion sensor 122 and the body portion BD.

As shown in FIG. 4A, for the purpose of calibration, the user U may perform an L-shaped pose. That is, the processor 116 may be configured to determine the relative position based on the calibration pose of the user U. While the user U is in the L-shaped pose, the shape of the body of the user U may look like an upside down L. By performing the L-shaped pose, the user U may bring the hand in front of the user U. As a result, the body motion sensor 122 of the body tracker 120 (i.e., the wristband) and the body portion BD (i.e., the wrist) may be in the FOV of the camera 114 of the HMD device 110. Thus, the processor 116 is able to determine the relative position between the body motion sensor 122 and the body portion BD based on the body image captured by the camera 114.

In addition, while the user U is performing the calibration pose with both bands, some body parameters may be obtained at the same time. For example, while the user U is performing the calibration pose, the wrist and the arm may be in the FOV of the camera 114 of the HMD device 110. Thus, based on the body image captured by the camera 114, the processor 116 may be configured to determine a length of an arm of the user U and a distance between the two arms of the user U. Based on the distance between the two arms of the user U, a shoulder width may be obtained. After the body parameters are obtained, the avatar of the user U may be able to reflect the actions of the user U in a more realistic manner.

Figure 4B:
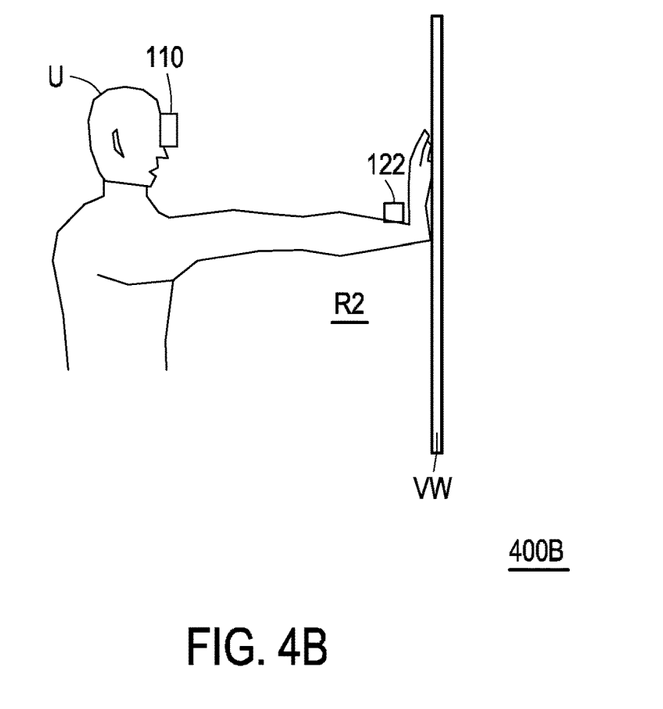
FIG. 4B is a schematic diagram of a tracking scenario according to an embodiment of the disclosure.
Figure 4C:
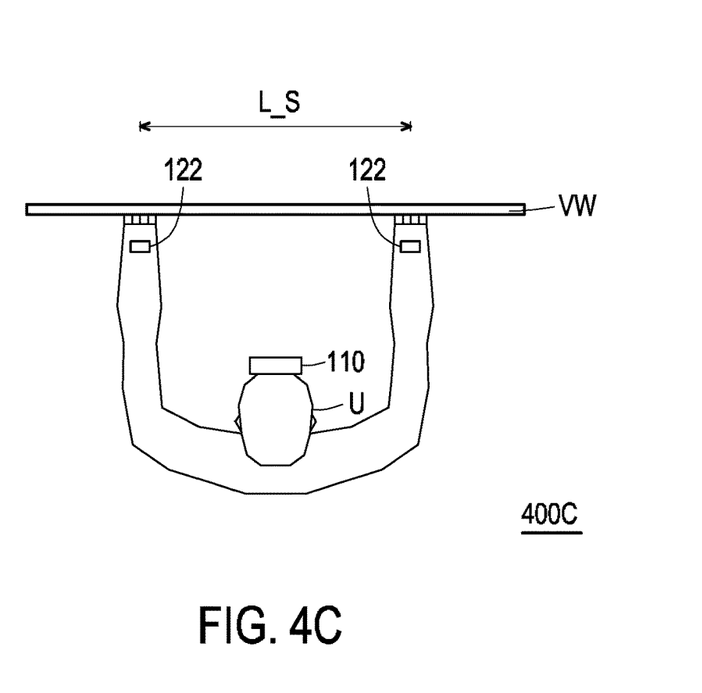
FIG. 4C is a schematic diagram of a tracking scenario according to an embodiment of the disclosure.

FIG. 4B is a schematic diagram of a tracking scenario according to an embodiment of the disclosure. FIG. 4C is a schematic diagram of a tracking scenario according to an embodiment of the disclosure. With reference to FIG. 4B and FIG. 4C, a tracking scenario 400B depicts a side view of the user U perform the L-shaped pose as the calibration pose in the virtual world and a tracking scenario 400C depicts a top view of the user U perform the L-shaped pose as the calibration pose in the virtual world. In FIG. 4B and FIG. 4C, a virtual wall VW in the virtual world may be displayed by the display 112. The function of the virtual wall VW is to assist the user U to perform the L-shaped pose as the calibration pose. For the sake of explanation, the virtual wall VW and the user U are depicted together in FIG. 4B and FIG. 4C, while user U is actually in the real world and the virtual wall VW is actually in the virtual world.

Referring to FIG. 4B, the virtual wall VW may be displayed to the user U and the user U may be instructed to push the virtual wall VW. The user U may make a pushing motion with both hands in the real world and an avatar of the user U may push the virtual wall VW in the virtual world. In order to make it easier for the user U to push and make more accurate measurements, the initial position of the virtual wall VW may be close to the user U, or more precisely, close to the body tracker 120. For example, if the initial position of the virtual wall VW is too far away from the user U, the user U may not be able to reach the virtual wall VW and the calibration may fail. If the initial position of the virtual wall VW is closer, the user U may be able to reach the virtual wall VW easily and then push the virtual wall VW away from the user U. In one embodiment, a virtual palm may be displayed on the virtual wall VW and the user U may put a hand of the user U on the virtual palm. The position (e.g., height) may be adjusted based on a height of the user U, for example, one-sixth of the height of the user U. In one embodiment, the size or relative position of the virtual palm(s) may be adjusted based on the size or relative distance of the hand(s) of user during the pushing motion.

In one embodiment, while the user U wears the HMD device 110, the camera 114 may be configured to obtain an image and the processor 116 may be configured to determine a height of the eyes of the user U or a height of the user U based on the image. The height of the eyes of the user U may be obtained based on the height of the HMD device 110. However, this disclosure is not limited thereto.

While the user U is pushing the virtual wall VW, the body motion sensor 122 may be configured to obtain the sensor data. Based on the sensor data of the body motion sensor 122, the processor 116 may be configured to determine a horizontal distance between the body motion sensor 122 and the HMD device 110. Further, based on the horizontal distance between the body motion sensor 122 and the HMD device 110, the processor 116 may be configured to determine a length of an arm of the user. For example, the user U may be instructed to move the hand to push the virtual VW away from the HMD device 110 and the body motion sensor 122 may be configured to obtain the sensor data at the same time. While the horizontal distance between the body motion sensor 122 and the HMD device 110 being the furthest, the processor 116 may be configured to determine a length of an arm of the user based on the sensor data of the body motion sensor 122. It is noted that, the user U may be able to push the virtual wall VW farther with one hand than with two hands. In addition, while the user U may push the virtual wall VW with the wrist instead of with the palm of the hand. Therefore, in response to user U being pushing the virtual wall VW not with the palm of the hand based on the body image captured by the camera 114, the body motion sensor 122 may be configured to not obtain the sensor data at the same time.

Similarly, referring to FIG. 4C, the user U may wear a body tracker 120 (also known as a first body tracker) on a left wrist and wear a body tracker 120 (also known as a second body tracker) on a right wrist. Based on the sensor data of the body motion sensor 122 from the each of the body trackers 120 on the left wrist and the right wrist, the processor 116 may be configured to determine a distance between two arms of the user U or a width L_S of shoulder of the user U. At the same time, the body motion sensor 122 may be configured to obtain the sensor data. While the horizontal distance between each of the body motion sensors 122 and the HMD device 110 being the furthest, the processor 116 may be configured to determine the width L_S of the shoulder based on the sensor data of the body motion sensors 122.

Figure 5A:
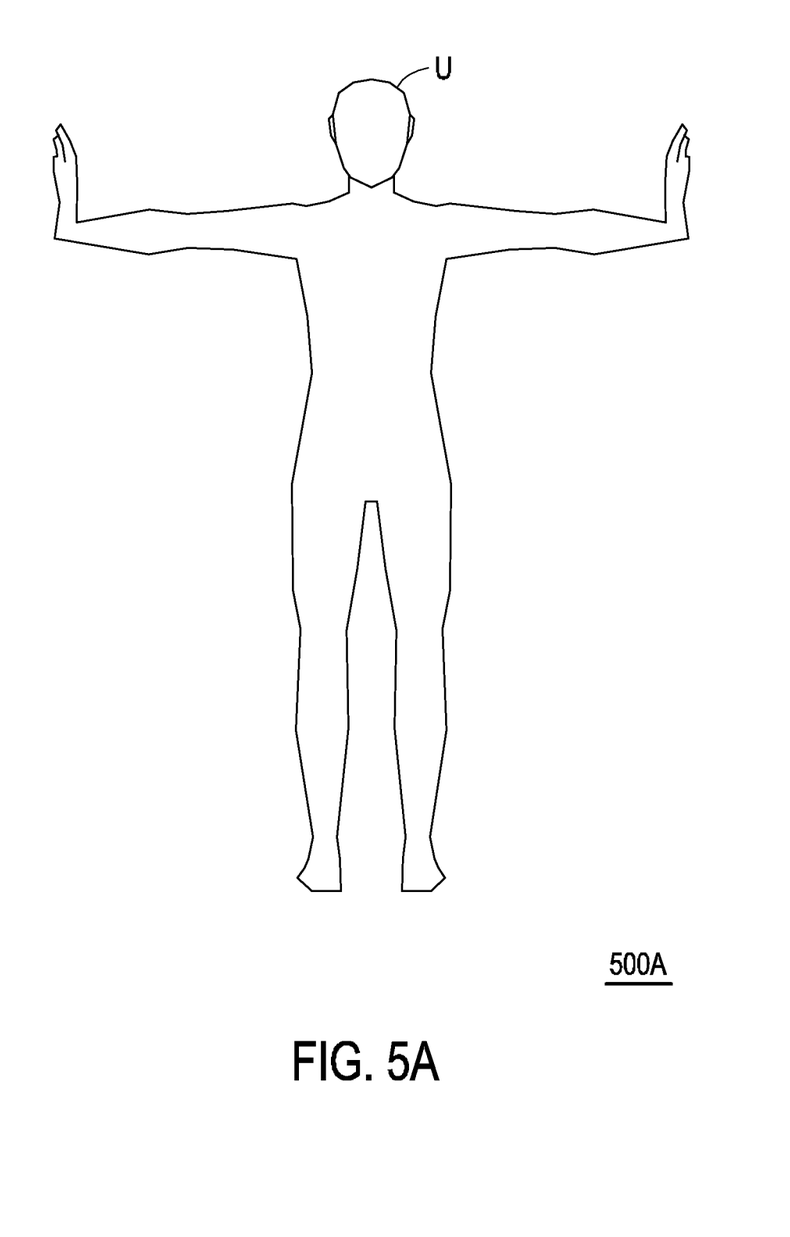
FIG. 5A is a schematic diagram of a tracking scenario according to an embodiment of the disclosure.

FIG. 5A is a schematic diagram of a tracking scenario according to an embodiment of the disclosure. With reference to FIG. 1A to FIG. 5A, a tracking scenario 500A depicts a T-shaped pose as a calibration pose for determination of the relative position between the body motion sensor 122 and the body portion BD.

As shown in FIG. 5A, for the purpose of calibration, the user U may perform a T-shaped pose. While the user U is in the T-shaped pose, the shape of the body of the user U may look like the letter T. By performing the T-shaped pose, the user U may bring the hands on the side of the user U. As a result, while the user U looks at the left hand or the right hand, the body motion sensor 122 of the body tracker 120 (i.e., the wristband) and the body portion BD (i.e., the wrist) may be in the FOV of the camera 114 of the HMD device 110. Thus, the processor 116 is able to determine the relative position between the body motion sensor 122 and the body portion BD based on the body image captured by the camera 114.

In addition, while the user U is performing the calibration pose, some body parameters may be obtained at the same time. For example, while the user U is performing the calibration pose, the wrist and the arm may be in the FOV of the camera 114 of the HMD device 110. Thus, based on the body image captured by the camera 114, the processor 116 may be configured to determine a length of an arm of the user U and a distance between the two wrists of the user U. Based on the distance between the two wrists of the user U, a length of outstretched arms may be obtained. Further, the body parameter may be refined based on the data collected from different calibration poses, such as the L-shaped pose and the T-shaped pose. For example, the shoulder width may be obtained based on the L-shaped pose and the length of outstretched arms may be obtained based on the T-shaped pose. A length of a single arm may be obtain by first subtracting shoulder width from the length of outstretched arm and then dividing the quotient by 2. After the body parameters are obtained, the avatar of the user U may be able to reflect the actions of the user U in a more realistic manner.

Figure 5B:
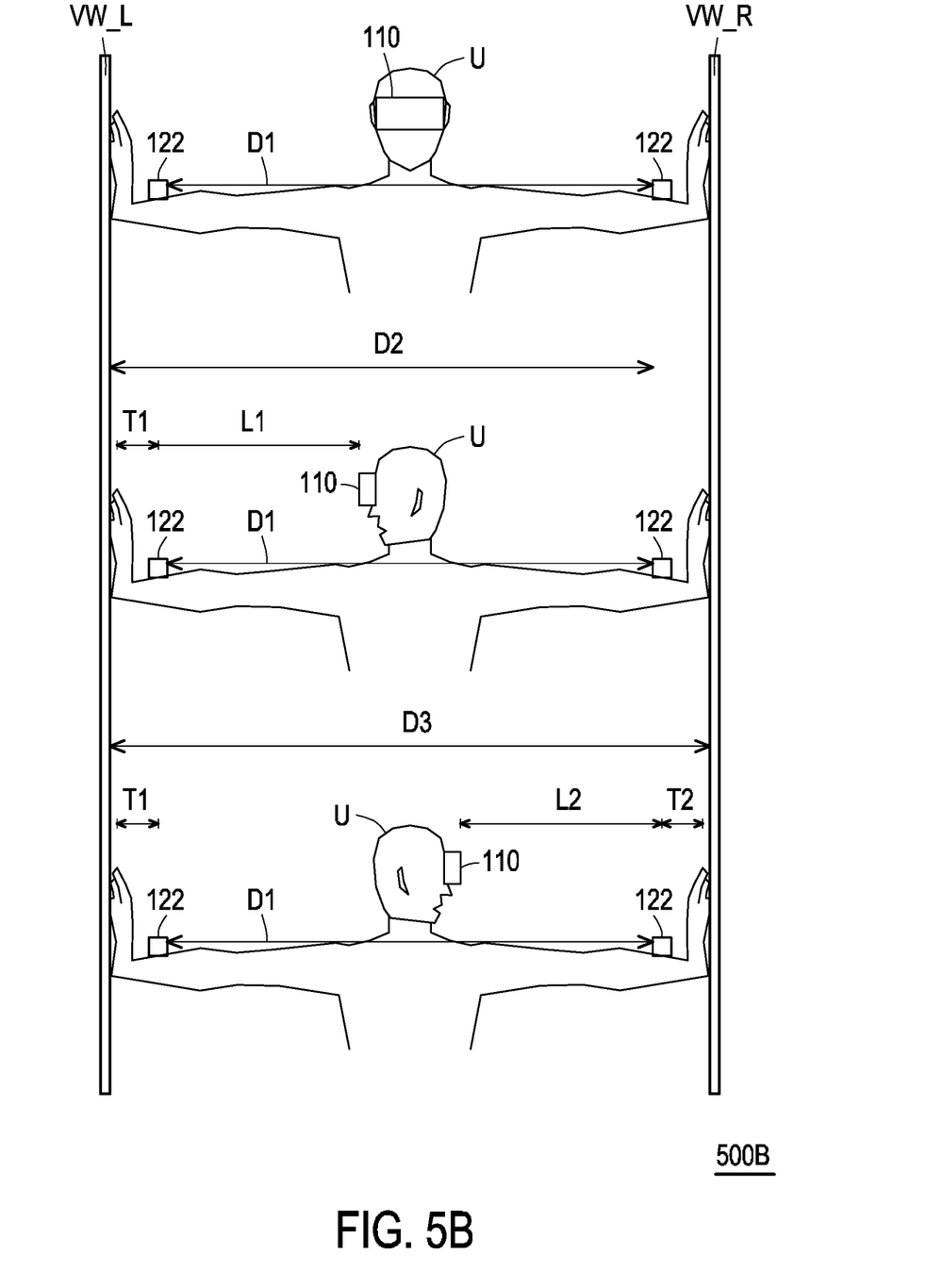
FIG. 5B is a schematic diagram of a tracking scenario according to an embodiment of the disclosure.
Figure 5C:
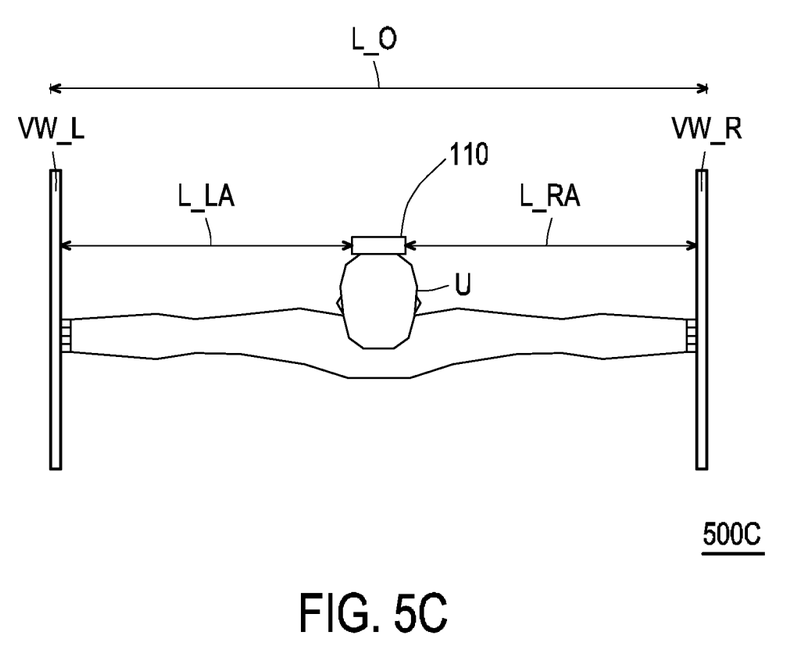
FIG. 5C is a schematic diagram of a tracking scenario according to an embodiment of the disclosure.

FIG. 5B is a schematic diagram of a tracking scenario according to an embodiment of the disclosure. FIG. 5C is a schematic diagram of a tracking scenario according to an embodiment of the disclosure. With reference to FIG. 5B and FIG. 5C, a tracking scenario 500B depicts a side view of the user U perform the T-shaped pose as the calibration pose in the virtual world and a tracking scenario 500C depicts a top view of the user U perform the T-shaped pose as the calibration pose in the virtual world. In FIG. 5B and FIG. 5C, a virtual wall VW_L and a virtual wall VW_R in the virtual world may be displayed by the display 112. The function of the virtual wall VW_L and the virtual wall VW_R is to assist the user U to perform the T-shaped pose as the calibration pose. For the sake of explanation, the virtual wall VW_L, the virtual wall VW_R and the user U are depicted together in FIG. 5B and FIG. 5C, while user U is actually in the real world and the virtual wall VW_L and the virtual wall VW_R are actually in the virtual world.

Referring to FIG. 5B, the virtual wall VW_L and the virtual wall VW_R may be displayed to the user U and the user U may be instructed to push the virtual wall VW_L and the virtual wall VW_R. In order to make it easier for the user U to push and make more accurate measurements, the initial position of the virtual wall VW_L and the virtual wall VW_R may be close to the user U, or more precisely, close to the body trackers 120. In one embodiment, a virtual palm may be displayed on the virtual wall VW_L and the virtual wall VW_R and the user U may put a hand of the user U on the virtual palm. The position (e.g., height) may be adjusted based on a height of the user U.

While the user U is pushing the virtual wall VW_L and the virtual wall VW_R, each of the body motion sensor 122 (also known as a first body tracker) on the left wrist and the body motion sensor 122 (also known as a second body tracker) on the right wrist may be configured to obtain the sensor data. Based on the sensor data of the body motion sensors 122, the processor 116 may be configured to determine a horizontal distance D1 between the body motion sensor 122 on the left wrist and the body motion sensor 122 on the right wrist as an initial distance. Then, the user U may be instructed to look at the left hand, so that the left hand may be in the FOV of the camera 114 of the HMD device 110. Based on an image captured by the camera 114, the processor 116 may be configured determine a length L1 from a left shoulder to the left wrist and a thickness T1 of a left palm. Further, the processor 116 may be configured to determine a horizontal distance D2 by calculating a sum of the horizontal distance D1 and the thickness T1. Similarly, the user U may be instructed to look at the right hand, so that the right hand may be in the FOV of the camera 114 of the HMD device 110. Based on an image captured by the camera 114, the processor 116 may be configured determine a length L2 from a right shoulder to the right wrist and a thickness T1 of a right palm. Further, the processor 116 may be configured to determine a horizontal distance D3 by calculating a sum of the horizontal distance D2 and the thickness T2. Therefore, a length of outstretched arms may be determined based on the horizontal distance D3.

It is noted that, referring to FIGS. 5B and 5C. By calculating a sum of the horizontal distance D1, the thickness T1 of the left palm, and the thickness T2 of the right palm, the processor 116 may be configured to determine a length L_O (i.e., the horizontal distance D3) of the outstretched arms. That is, the processor 116 may be configured to determine a length L_O of the outstretch arms of the user U based on the sensor data of the first body tracker and the sensor data of the second body tracker. For example, the user U may move the head left and right to look at the left hand and the right hand. At the same time, the head motion sensor 118 may be configured to obtain the head motion sensor data. While the direction of the sight of the user U being parallel to the virtual wall VW_L and the virtual wall VW_R, the processor 116 may be configured to determine a center position of the user U based on the head motion sensor data by the head motion sensor 118 of the HMD device 110. Further, the user U may be instructed to move the arms to push the virtual wall VW_L and the virtual wall VW_R. At the same time, the body motion sensor 122 may be configured to obtain the sensor data. While the horizontal distance between each of the body motion sensors 122 and the HMD device 110 (i.e., the center position) being the furthest, the processor 116 may be configured to determine the length L_O of outstretched arms, the length L_LA of the left arm, and the length L_RA of the right arm based on the sensor data by the body motion sensors 122 of the body tracker 120. In other words, while the horizontal distance D3 (the distance between the two body motion sensors 122)

decrease, the processor 116 may be configured to instruct the user how to perform the calibration pose correctly (e.g., keep arms open).

Figure 6:
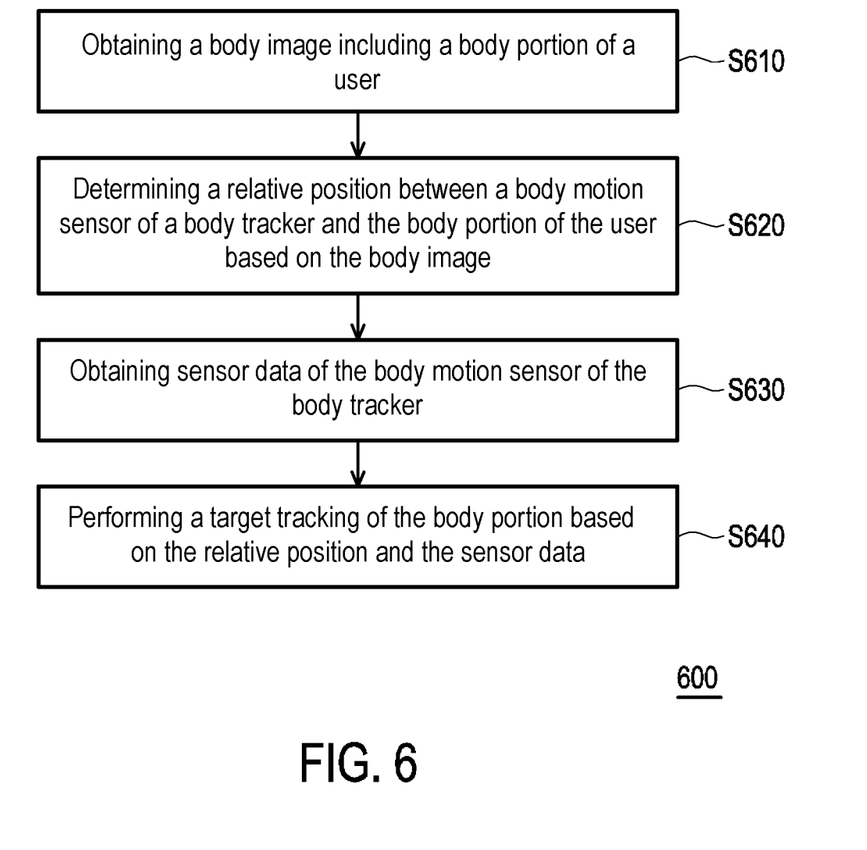
FIG. 6 is a schematic flowchart of a tracking method according to an embodiment of the disclosure.

FIG. 6 is a schematic flowchart of a tracking method according to an embodiment of the disclosure. With reference to FIG. 1A to FIG. 6, a tracking method 600 may include a step S610, a step S620, a step S630, and a step S640.

In the step S610, a body image may be obtained by the camera 114 and the body image may include a body portion BD of the user U. In the step S620, a relative position between the body motion sensor 122 of a body tracker 120 and the body portion BD of the user U may be determined based on the body image. The body tracker 120 may be adapted to be mounted on the body portion BD of the user U. In the step S630, sensor data of the body motion sensor 122 of the body tracker 120 may be obtained. The sensor data may be configured to indicate a movement and/or a rotation of the body portion BD. In the step S640, a target tracking of the body portion BD may be performed based on the relative position and the sensor data.

In addition, the implementation details of the tracking method may be referred to the descriptions of FIG. 1A to FIG. 5C to obtain sufficient teachings, suggestions, and implementation embodiments, while the details are not redundantly described seriatim herein.

In summary, according to the tracking system 100A, the tracking system 100B, and the tracking method 600, even if the body tracker 120 is not worn properly on the body portion of the user, the processor 116 is still able to track the body portion accurately based on the relative position between the body motion sensor 122 and the body portion. Further, while the body portion is not the in field of view (FOV) of the camera 114, the processor 116 is still able to perform the target tracking without the body image based on the relative position and sensor data. Therefore, the user experience is improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A tracking system, comprising:
a head-mounted display (HMD) device, adapted to be mounted on a head of a user and comprising:
a camera, configured to obtain a body image including a body portion of the user; and
a processor, configured to:
determine a relative position between a body motion sensor of a body tracker and the body portion of the user based on the body image; and
perform a target tracking of the body portion based on the relative position and sensor data of the body motion sensor of the body tracker; and
the body tracker, adapted to be mounted on the body portion of the user and comprising:
the body motion sensor, configured to obtain the sensor data, wherein the sensor data is configured to indicate a movement and/or a rotation of the body portion.

2. The tracking system according to claim 1, wherein the HMD device further comprises a display configured to display a virtual body portion of an avatar of the user in a virtual world based on the target tracking.

3. The tracking system according to claim 1, wherein the processor is further configured to:
obtain a simultaneous localization and mapping (SLAM) map;
determine a tracker coordinate of the body tracker based on the SLAM map;
determine a sensor coordinate of the body motion sensor based on the SLAM map; and
determine the relative position based on the tracker coordinate and the sensor coordinate.

4. The tracking system according to claim 1, wherein the processor is further configured to:
perform object detection to recognize the body portion and the body motion sensor in the body image utilizing an object detection algorithm; and
determine the relative position based on the object detection.

5. The tracking system according to claim 1, wherein the processor is further configured to:
obtain an ideal wearing position on the body portion;
determine an actual wearing position of the body motion sensor based on the body image; and
determine the relative position based on the ideal wearing position and the actual wearing position.

6. The tracking system according to claim 1, wherein the processor is further configured to determine the relative position based on a calibration pose of the user.

7. The tracking system according to claim 6, wherein the processor is further configured to determine a length of an arm of the user based on the calibration pose and the body image and/or the sensor data.

8. The tracking system according to claim 6, wherein the HMD device further comprise a display configured to display a virtual wall in a virtual world to assist the user to perform the calibration pose.

9. The tracking system according to claim 6, wherein
the calibration pose is an L-shaped pose,
the body tracker comprises a first body tracker and a second body tracker, and
the processor is further configured to determine a width of shoulder of the user based on the sensor data of the first body tracker and the sensor data of the second body tracker.

10. The tracking system according to claim 6, wherein
the calibration pose is a T-shaped pose,
the body tracker comprises a first body tracker and a second body tracker, and
the processor is further configured to determine a length of outstretch arms of the user based on the sensor data of the first body tracker and the sensor data of the second body tracker.

11. A tracking method, comprising:
obtaining a body image including a body portion of a user;
determining a relative position between a body motion sensor of a body tracker and the body portion of the user based on the body image, wherein the body tracker is adapted to be mounted on the body portion of the user;
obtaining sensor data of the body motion sensor of the body tracker, wherein the sensor data is configured to indicate a movement and/or a rotation of the body portion; and
performing a target tracking of the body portion based on the relative position and the sensor data.

12. The tracking method according to claim 11, wherein the tracking method further comprises:

displaying a virtual body portion of an avatar of the user in a virtual world based on the target tracking.

13. The tracking method according to claim 11, wherein the tracking method further comprises:
obtaining a simultaneous localization and mapping (SLAM) map;
determining a tracker coordinate of the body tracker based on the SLAM map;
determining a sensor coordinate of the body motion sensor based on the SLAM map; and
determining the relative position based on the tracker coordinate and the sensor coordinate.

14. The tracking method according to claim 11, wherein the tracking method further comprises:
performing object detection to recognize the body portion and the body motion sensor in the body image utilizing an object detection algorithm; and
determining the relative position based on the object detection.

15. The tracking method according to claim 11, wherein the tracking method further comprises:
obtaining an ideal wearing position on the body portion;
determining an actual wearing position of the body motion sensor based on the body image; and
determining the relative position based on the ideal wearing position and the actual wearing position.

16. The tracking method according to claim 11, wherein the tracking method further comprises:
determining the relative position based on a calibration pose of the user.

17. The tracking method according to claim 16, wherein the tracking method further comprises:
determine a length of an arm of the user based on the calibration pose and the body image and/or the sensor data.

18. The tracking method according to claim 16, wherein the tracking method further comprises:
displaying a virtual wall in a virtual world to assist the user to perform the calibration pose.

19. The tracking method according to claim 16, wherein the calibration pose is an L-shaped pose,
the body tracker comprises a first body tracker and a second body tracker, and
the tracking method further comprises:
determining a width of shoulder of the user based on the sensor data of the first body tracker and the sensor data of the second body tracker.

20. The tracking method according to claim 16, wherein the calibration pose is a T-shaped pose,
the body tracker comprises a first body tracker and a second body tracker, and
the tracking method further comprises:
determining a length of outstretch arms of the user based on the sensor data of the first body tracker and the sensor data of the second body tracker.

* * * * *